Dec. 29, 1959  F. C. ROBINSON ET AL  2,919,390
ELECTRICAL CAPACITORS
Filed July 30, 1954
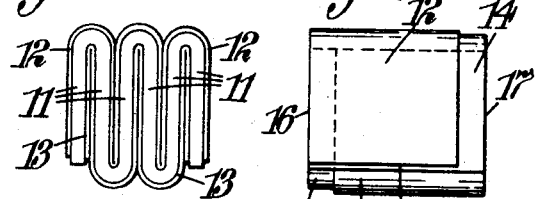
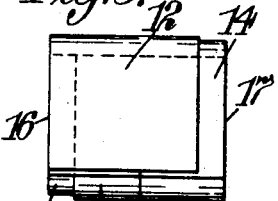
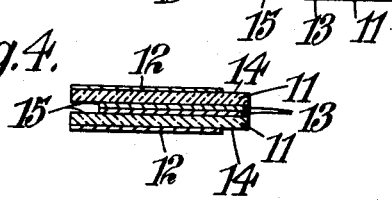
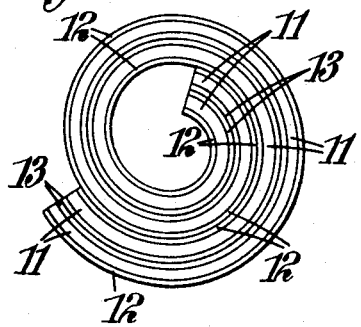
INVENTORS
Richard A. Grouse
Frederick C. Robinson
BY Watson, Cole, Grindle & Watson
ATTORNEYS United States Patent Office 2,919,390
Patented Dec. 29, 1959

2,919,390

ELECTRICAL CAPACITORS

Frederick Chetham Robinson and Richard Alfred Grouse, Wandsworth, London, England, assignors to A. H. Hunt (Capacitors) Limited, London, England, a British company Application July 30, 1954, Serial No. 446,823

Claims priority, application Great Britain July 31, 1953

4 Claims. (Cl. 317—260)

This invention is concerned with the manufacture of solid-dielectric capacitors in which the electrodes forming the capacitor are produced by the deposition of a suitable metal on opposite surfaces of the dielectric by a process of evaporation in vacuo or by other suitable means. When metal is deposited on both faces of a dielectric the effect is that in a dielectric between two layers of metal there are no air-spaces. Air-spaces are undesirable for a number of reasons, notably variation of capacitance due to variation of pressure on the metal surface and reduction of dielectric strength due to ionization under certain conditions of use. If, however, a capacitor is made up of alternate layers of paper and foil or other dielectric and foil, the capacitor is very dependent upon the pressure with which the metal and dielectric are held together and very prone to the faults mentioned above. It is obvious that capacitors produced from dielectric metallised on both faces cannot be wound into rolls without the insertion of a further layer of dielectric so as to prevent opposite electrodes short circuiting together. The insertion of the additional layer of dielectric, however, introduces the air-spaces, liability to variation of capacity and other faults mentioned above, which it is the object of the metallisation of the dielectric on both faces to avoid.

This invention has for its object, means of manufacturing a capacitor having dielectric metallised on both faces without the need to insert an additional dielectric to insulate opposite electrodes.

According to the present invention, dielectric metallised on opposite faces is produced in strip form with an unmetallised margin on one face running along one edge of the strip and on the other face along the opposite edge of the strip, the strip is formed into a capacitor by folding or winding it in such manner that the two opposite faces are nowhere in contact with each other, and then terminal connections are made to the metallised faces by spraying or otherwise bonding with metal one end of the assembly, where lie the strip edges up to which the metallisation of one polarity extends, to constitute one terminal, and likewise the other end of the assembly, where lie the edges up to which the metallisation of opposite polarity extends, to constitute a second terminal of the capacitor.

Various methods of carrying the invention into effect will now be described, by way of example, and with reference to the accompanying diagrammatic drawings in which:

Figure 1 shows in cross section a strip of the metallised dielectric to be used in making capacitors, Figures 2 and 3 illustrate a method of folding the strip to obtain the desired result, and Figures 4 and 5 illustrate an alternative method in which two lengths of the strip are wound together.

In Figure 1 there is shown in cross section a strip of dielectric material 11 metallised on both faces with layers of metallisation 12, 13. The metallisation 12 extends all over one face of the strip 11 except for an unmetallised margin 14 along the right-hand edge as viewed in the figure, while the metallisation 13 extends all over the opposite face except for an unmetallised margin 15 along the left-hand edge. Such a strip may be produced by metallising the whole of both faces and subsequently removing the metal from the marginal portions by the known technique of electrical demetallisation.

One method of assembling the strip so that the opposed faces never touch each other is to assemble them in zigzag shape as shown in Figures 2 and 3. At each place where the strip 11 is doubled over in the zigzag, two portions of one metallised layer 12 or 13 come in contact with one another and at the next folding two portions of the other metallised layer come in contact with one another, but the opposed faces never meet, and owing to the way in which opposite margins 14, 15 are demetallised along opposite faces, one polarity is exposed only at one end 16 or 17 of the assembly and the other polarity only at the other. There is no capacity between the metallised faces where they touch each other, because they are of the same polarity. This makes a capacitor which can be assembled from a single strip and is not susceptible to variation due to pressure. Terminal connections can be attached by spraying the ends 16, 17 of the assembly with metal and then soldering on terminals, or in any other convenient manner.

In another method of assembling a capacitor shown in Figures 4 and 5, two lengths of the strip dielectric 11, each metallised on both faces as before with layers of metallisation 12, 13 and unmetallised margins 14, 15 extending along opposite edges of its opposed faces, are taken and rolled together. The lengths are brought together as in Figure 4, with their metallised layers 13 contiguous and the unmetallised margin 15 of one strip directly facing the unmetallised margin 15 of the second strip. When the two lengths are wound into a roll as in Figure 5, the same result is produced as with the zigzag form of assembly, that is to say the opposed metallised faces 12, 13 are kept out of contact. Terminals can be attached as before. It will be appreciated that any even number of lengths can be wound simultaneously in this manner.

It is to be noted that while any desired dielectric that is, or can be rendered, sufficiently flexible can be employed, the preferred dielectrics are those which are manufactured from non-porous plastic materials in sheet form, as these can be metallised directly upon opposed faces without danger of short circuiting the capacitor through pores in the dielectric. Ordinarily other dielectrics need to be covered with coats of lacquer before metallisation. The preferred dielectric, according to the present invention, is that made from polyethylene terephthalate and marketed under the trade names of "Melinex" and "Mylar." Alternatively, any plastic film material having suitable properties for the manufacture of capacitors, such as polyethene, may be employed.

We claim:

1. A method of making an electrical capacitor comprising producing in strip form flexible dielectric metallised all over both faces, removing by electrical demetallising technique a marginal strip of the metallisation on one face aong one edge of the strip, likewise removing an equivalent marginal strip of the metallisation on the other face and along the opposite end of the strip, forming the strip into a capacitor by winding at least one pair of lengths of the strip together into a roll with one metallised face of one of the pair contiguous with one metallised face of the other and the non-metallised margins of the contiguous faces directly facing one another, and then making terminal connections to the metallised faces by bonding with metal one end of the roll, where lie the strip edges up to which the metallisation of one polarity extends, to constitute one terminal, and likewise the other end of the roll, where lie the edges up to which the metallization of opposite polarity extends, to constitute a second terminal of the capacitor whereby the presence of air spaces between the layers of metallisation is avoided.

2. A method as claimed in cclaim 1 wherein the dielectric is a synthetic plastic film material.

3. A method of making an electrical capacitor comprising producing in strip form flexible polyethylene terephthalate dielectric metallised all over both faces, removing by electrical demetallising technique a marginal strip of the metallisation on one face along one edge of the strip, likewise removing an equivalent marginal strip of the metallisation on the other face and along the opposite end of the strip, forming the strip into a capacitor by winding at least one pair of lengths of the strip together into a roll with one metallised face of one of the pair contiguous with one metallised face of the other and the non-metallised margins of the contiguous faces directly facing one another, and then making terminal connections to the metallised faces by bonding with metal one end of the roll, where lie the strip edges up to which the metallisation of one polarity extends, to constitute one terminal and likewise the other end of the roll, where lie the edges up to which the metallisation of opposite polarity extends, to constitute a second terminal of the capacitor.

4. An electrical capacitor comprising at least one pair of lengths of flexible dielectric material wound together into a roll, each of said lengths being metallised all over both faces except for a demetallised margin on one face running along one edge and a similar demetallised margin on the other face and along the opposite edge, the two lengths being wound with one metallised face of one contiguous with one metallised face of the other and the demetallised margins of the contiguous faces directly facing one another, metal bonding one end of the roll where lie the strip edges up to which the metallisation of one polarity extends to constitute one terminal connection, and likewise the other end of the roll, where lie the edges up to which the metallisation of opposite polarity extends, to constitute a second terminal of the capacitor.

References Cited in the file of this patent

FOREIGN PATENTS

| | | |
|---|---|---|
| 624,074 | Great Britain | May 26, 1949 |
| 679,732 | Great Britain | Sept. 24, 1952 |
| 732,726 | Germany | Mar. 10, 1943 |
| 903,040 | France | Sept. 25, 1945 |